US006974601B2

(12) United States Patent
Kweon et al.

(10) Patent No.: US 6,974,601 B2
(45) Date of Patent: Dec. 13, 2005

(54) METHOD OF PREPARING POSITIVE ACTIVE MATERIAL FOR RECHARGEABLE LITHIUM BATTERY

(75) Inventors: Ho-Jin Kweon, Cheonan (KR); Hyun-Sook Jung, Cheonan (KR); Yong-Chul Park, Cheonan (KR); Geun-Bae Kim, Cheonan (KR)

(73) Assignee: Samsung SDI Co., Ltd., Suwon (KR)

(*) Notice: Subject to any disclaimer, the term of this patent is extended or adjusted under 35 U.S.C. 154(b) by 4 days.

(21) Appl. No.: 10/808,034

(22) Filed: Mar. 23, 2004

(65) Prior Publication Data

US 2004/0180134 A1   Sep. 16, 2004

Related U.S. Application Data

(62) Division of application No. 09/792,407, filed on Feb. 22, 2001, now Pat. No. 6,737,195.

(30) Foreign Application Priority Data

| Mar. 13, 2000 | (KR) | ................................ 2000-12504 |
| Feb. 1, 2001 | (KR) | ................................ 2001-4898 |

(51) Int. Cl.[7] .............................................. B05D 5/12

(52) U.S. Cl. ...................... 427/115; 427/212; 427/216; 427/217

(58) Field of Search ........................ 427/115, 212, 216, 427/217; 429/231.95

(56) References Cited

U.S. PATENT DOCUMENTS

| 5,705,291 | A | * | 1/1998 | Amatucci et al. ............ 429/137 |
| 5,733,685 | A | * | 3/1998 | Wang .......................... 429/224 |
| 6,103,421 | A |   | 8/2000 | Torata et al. |
| 6,372,385 | B1 | * | 4/2002 | Kweon et al. ......... 429/231.95 |
| 6,756,155 | B1 | * | 6/2004 | Kweon et al. ......... 429/231.95 |
| 2002/0114993 | A1 |   | 8/2002 | Miyaki et al. |

FOREIGN PATENT DOCUMENTS

JP           09-055210      *   2/1997

* cited by examiner

*Primary Examiner*—Brian K. Talbot
(74) *Attorney, Agent, or Firm*—Christie, Parker & Hale, LLP

(57) ABSTRACT

Disclosed is a positive active material for a rechargeable lithium battery. The positive active material includes at least one compound represented by formulas 1 to 4:

$$Li_xNi_{1-y}Mn_yF_2 \quad (1)$$

$$Li_xNi_{1-y}Mn_yS_2 \quad (2)$$

$$Li_xNi_{1-y-z}Mn_yM_zO_{2-a}F_a \quad (3)$$

$$Li_xNi_{1-y-z}Mn_yM_zO_{2-a}S_a \quad (4)$$

where M is selected from the group consisting of Co, Mg, Fe, Sr, Ti, B, Si, Ga, Al, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr, $0.95 \leq x \leq 1.1$, $0 < y \leq 0.99$, $0 \leq z \leq 0.5$, and $0 \leq a \leq 0.5$; and a metal oxide or composite metal oxide layer formed on the compound.

6 Claims, 5 Drawing Sheets

(mAh/g)

METHOD OF PREPARING POSITIVE ACTIVE MATERIAL FOR RECHARGEABLE LITHIUM BATTERY

CROSS REFERENCE TO RELATED APPLICATION

This application is a divisional of U.S. application Ser. No. 09/792,407, filed Feb. 22, 2001, and issued as U.S. Pat. No. 6,737,195, and is based on and claims priority to application Nos. 00-12504 and 01-4898 filed in the Korean Industrial Property Office on Mar. 13, 2000 and Feb. 1, 2001, the content of which is incorporated herein by reference.

BACKGROUND OF THE INVENTION (a) Field of the Invention

The present invention relates to a positive active material for a rechargeable lithium battery and a method of preparing the same, and more particularly, to a positive active material for a rechargeable lithium battery exhibiting good electrochemical properties and a method of preparing the same.

(b) Description of the Related Art

Rechargeable lithium batteries use a material from or into which lithium ions are intercalated or deintercalated as positive and negative active materials. Rechargeable lithium batteries produce electric energy by an oxidation and reduction reaction during the intercalation and deintercalation of lithium ions.

For the positive active material in the rechargeable lithium battery, chalcogenide compounds into or from which lithium ions are intercalated or deintercalated are generally used. Typical examples include $LiCoO_2$, $LiMn_2O_4$, $LiMnO_2$, $LiNiO_2$, or $LiNi_{1-x}Co_xO_2$ (0<X<1). $LiCoO_2$ provides good electrical conductivity, a high cell voltage of about 3.7V, good cycle life and safety characteristics, and high discharge capacity of 160 mAh/g, and thus it is widely used. However, it is very expensive and the cost portion of $LiCoO_2$ reaches to 30% of the total manufacturing cost of the battery. Therefore, it is desirable to develop a low cost positive active material to replace $LiCoO_2$.

Manganese-based materials such as $LiMn_2O_4$ or $LiMnO_2$ are easy to prepare, cost less than $LiCoO_2$, are environmentally friendly, and have higher cell voltage (3.9V) than that of $LiCoO_2$. However, the manganese-based materials have a low capacity of about 120 mAh/g, which is smaller than that of $LiCoO_2$ by 20%. Thus, with manganese-based materials it is difficult to fabricate high capacity or thin batteries. $LiNiO_2$ is also lower cost than $LiCoO_2$ and has a high charge capacity, but is difficult to produce. $LiNi_{1-x}Co_xO_2$ (0<X<1) also has a larger capacity (200 mAh/g) than $LiCoO_2$, but a lower discharge potential, inferior cycle characteristics to $LiCoO_2$, and poor safety characteristics.

SUMMARY OF THE INVENTION

It is an object of the present invention to provide a positive active material for a rechargeable lithium battery exhibiting good electrochemical characteristics, which is also inexpensive.

It is another object to provide a positive active material for a rechargeable lithium battery exhibiting good thermal stability.

It is still another object to provide a method of preparing the positive active material.

These and other objects may be achieved by a positive active material for a rechargeable lithium battery including at least one compound represented by formulas 1 to 4, and a metal oxide or composite metal oxide layer formed on the compound.

  (1)

  (2)

  (3)

  (4)

(where M is selected from the group consisting of Co, Mg, Fe, Sr, Ti, B, Si, Ga, Al, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr, and $0.95 \leq x \leq 1.1$, $0 < y \leq 0.99$, $0 \leq z \leq 0.5$, and $0 \leq a \leq 0.5$)

In order to achieve the objects, the present invention provides a method of preparing the positive active material for a rechargeable lithium battery. In the method, at least one compound represented by formulas 1 to 4 is prepared and the compound is coated with a metal alkoxide solution, an organic solution of metal salt or an aqueous solution of metal salt. The coated compound is then heat-treated. The compound represented by formulas 1 to 4 is prepared by co-precipitating a nickel salt and a manganese salt to prepare a nickel manganese salt, mixing the nickel manganese salt with a lithium salt, and then heat-treating the mixture. In the co-precipitation step, a fluorine or sulfur salt may be further used. Alternatively, a salt of metal is further used in the mixing step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1A:
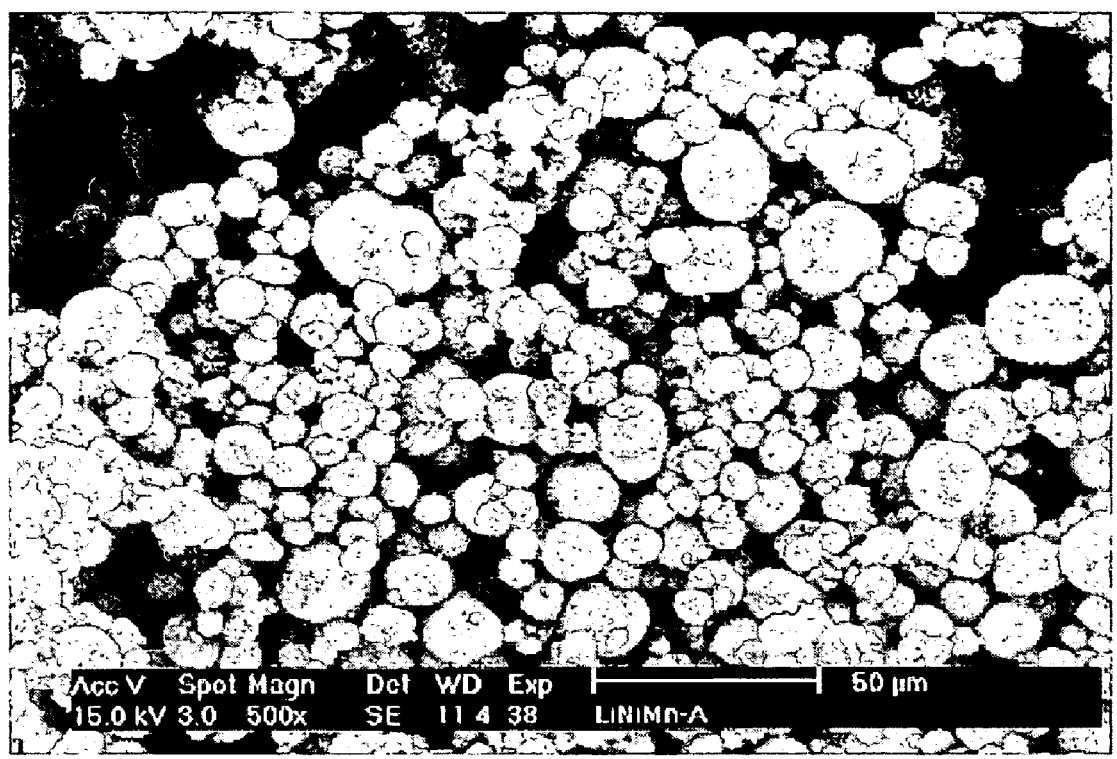
FIG. 1a is an SEM photograph showing a positive active material of the present invention.

A positive active material of the present invention is a $LiNiMnO_2$-based material to replace $LiCoO_2$ which exhibits good electrochemical properties but is of high cost. The $LiNiMnO_2$-based material of the present invention uses Ni and Mn which is lower cost than Co. It has the advantages of both $LiNiO_2$, which has high discharge capacity and is low cost, and $LiMnO_4$ which exhibits high cell voltage and is also of low cost. In addition, the positive active material of the present invention has a metal oxide or composite metal oxide layer included on a surface thereof to improve charge-discharge characteristics. Accordingly, the positive active material of the present invention has comparable electrochemical properties to that of $LiCoO_2$ while it is significantly lower cost than $LiCoO_2$. The positive active material of the present invention can economically provide rechargeable lithium batteries exhibiting good electrochemical properties (especially cycle life, high-rate characteristics, high discharge potential, and thermal stability).

The positive active material of the present invention includes at least one compound represented by formulas 1 to 4.

$$Li_xNi_{1-y}Mn_yF_2 \tag{1}$$

$$Li_xNi_{1-y}Mn_yS_2 \tag{2}$$

$$Li_xNi_{1-y-z}Mn_yM_zO_{2-a}F_a \tag{3}$$

$$Li_xNi_{1-y-z}Mn_yM_zO_{2-a}S_a \tag{4}$$

(where M is selected from the group consisting of Co, Mg, Fe, Sr, Ti, B, Si, Ga, Al, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr, and $0.95 \leq x \leq 1.1$, $0 < y \leq 0.99$, $0 \leq z \leq 0.5$, and $0 \leq a \leq 0.5$)

The metal in the metal oxide or composite metal oxide layer is selected from Mg, Al, Co, K, Na, Ca, Si, Ti, V, Sn, Ge, Ga, B or As. The composite metal oxide is formed by reacting a metal salt or salts with the metal compound represented by formulas 1 to 4.

It is preferable that the thickness of the metal oxide or composite metal oxide layer is 1 to 100 nm, and preferably 1 to 50 nm. If the thickness of the oxide layer is less than 1 nm, the effect obtained by coating metal oxide or composite metal oxide onto the compound is not evident. Whereas, if the thickness thereof is more than 100 nm, the oxide layer becomes undesirably thick so that the movement of lithium ions is hindered significantly.

A method of preparing a positive active material will be illustrated in more detail.

A nickel salt and a manganese salt are co-precipitated to produce a nickel manganese salt. Alternatively, a fluorine salt or a sulfur salt may be co-precipitated together with the nickel and manganese salts. Any nickel, manganese, fluorine and sulfur salts may be employed as long as the resultant compound is capable of intercalating and deintercalating lithium ions. However, one exemplary embodiment of the nickel salt may be nickel hydroxide, nickel nitrate or nickel acetate, and of the manganese salt may be manganese acetate or manganese dioxide. The fluorine salt may be manganese fluoride or lithium fluoride, and the sulfur salt may be manganese sulfide or lithium sulfide.

The nickel manganese salt is mixed with a lithium salt. The lithium salt may be lithium nitrate, lithium acetate or lithium hydroxide, but it is not limited thereto. Alternatively, an additional metal salt may be added to the mixture. The metal may be Co, Mg, Fe, Sr, Ti, B, Si, Ga, Al, Sc, Y, or a metal from the lanthanide or actinide series. The lanthanide series includes La, Ce, Pr, Nd, Pm, Sm, Eu, Gd, Tb, Dy, Ho, Er, Tm, Yb and Lu, and the actinide series includes Ac, Th, Pa, U, Np, Pu, Am, Cm, Bk, Cf, Es, Fm, Md, No and Lw. One exemplary form of the metal salt may be an oxide, a nitrate, an acetate or a hydroxide of the metal. The mixing step may be a dry mixing process, or a wet mixing process using an organic solvent as the mixing medium. The organic solvent may be an alcohol such as ethanol, or acetone.

In the above preparation, a compound represented by one of formulas 1 to 4 is obtained.

The mixture is heat-treated (first heat-treatment) in a stream of air to prepare a compound represented by one of formulas 1 to 4. The heat-treating step is performed at 200 to 900° C. for 1 to 20 hours in the presence of oxygen. If the heat-treating step is performed at less than 200° C., the lithium salts do not react completely with the metal salts. If the heat-treating step is performed above 900° C., Li is partially evaporated resulting in the formation of a lithium-deficient compound. If the heat-treating is performed for less than 1 hour, the desired crystalline material is not formed. If the heat-treating is performed for a period longer than 20 hours, an overly crystallized product is obtained or Li is partially evaporated thereby causing an unstable structure.

Subsequently, the resulting compounds are coated with a metal alkoxide solution, an organic solution of metal salt, or an aqueous solution of metal salt. The coating process may be performed by a sputtering method, a chemical vapor deposition (CVD) method, an impregnation method such as dip coating, or by using any other general-purpose coating technique. Any other coating techniques, if available and applicable, may be as effective as the methods described herein. A common method of coating is dip coating the powder in the solution.

The metal in the metal alkoxide solution, the organic solution of metal salt, or an aqueous solution of metal salt may be any metal that is capable of dissolving in alcohol, organic solvents or water. One exemplary embodiment of the metal may be Mg, Al, Co, K, Na, Ca, Si, Ti, V, Sn, Ge, Ga, B or As. A preferable metal is Al.

The metal alkoxide solution is prepared by the reaction of an alcohol with metal of 0.1 to 20% by weight, and preferably 0.1 to 10% by weight of the alcohol. Alternatively, the metal alkoxide is prepared by dissolving metal alkoxide. The alcohol may be methanol, ethanol, or isopropanol. The organic solution of metal salt is prepared by mixing organic solvent with metal salt of 0.1 to 20% by weight, and preferably 0.1 to 10% by weight of the organic solvent. Useful organic solvent is hexane, chloroform, tetrahydrofuran, ether, methylene chloride or acetone. The metal aqueous solution is prepared by mixing water with metal or metal oxide of 0.1 to to 20% by weight, and preferably 0.1 to 10% by weight of water.

One exemplary embodiment of the metal alkoxide solution is tetraorthosilicate purchased from Aldrich, Co., or tetraethylorthosilicate obtained from a mixture of silicate and ethanol. One exemplary embodiment of the metal aqueous solution is vanadium oxide or ammonium vanadate.

When the metal is less than 0.1% by weight of alcohol, organic solvent or water, the effect obtained by coating the solution onto the powder is not evident. In contrast, when metal is more than 20% by weight of water or alcohol, the resultant coating layer becomes undesirably thick.

The coated compound is dried under ambient atmosphere followed by a heat-treatment (second heat-treatment). The heat-treating step is carried out at 100 to 800° C. for 5 to 20 hours. If the heat-treating temperature is lower than 100° C., an oxide layer is not formed on the surface, whereas, if the heat-treating temperature is above 800° C., the metal oxide or metal salt is diffused into the crystalline structure. If the heat-treating step is carried out for more than 20 hours, similar problems may occur.

As a result of the heat-treatment, the metal alkoxide solution, metal salt organic solution, or metal salt aqueous solution is converted into metal oxide or composite metal oxide. In this way, a metal oxide or composite metal oxide-coated active material is prepared. The metal oxide formed on the surface of the compound may be derived from a single metal alkoxide solution, metal salt organic solution or metal salt aqueous solution, while the composite metal oxide formed on the surface of the compound may be derived from a composite material including cobalt, nickel, nickel-manganese or manganese salt and metal alkoxide solution, metal salt organic solution or metal salt aqueous solution. For example, $LiCoO_2$ can be coated with aluminum alkoxide sol and then this alkoxide-coated $LiCoO_2$ can be heat-treated to produce a positive active material coated with a composite metal oxide of cobalt and aluminum (Co—Al—O) and/or aluminum oxide ($Al_2O_3$). The heating step is preferably performed under dry air or oxygen to obtain a uniform crystalline active material.

The positive active material of the present invention obtained from the above procedure has a spherical form, and exhibits a comparable or greater discharge capacity than $LiCoO_2$. Furthermore, the cost for producing $LiCoO_2$ is high because expensive $Co_3O_4$ is used for a starting material (the cost of $Co_3O_4$ accounts for 70% or more of the production cost of $LiCoO_2$), but the positive active material of the present invention is produced with low cost nickel salt and manganese salt so that the production cost is significantly reduced. The positive active material of the present invention has a metal oxide or composite metal oxide layer, which results in the prevention of voltage fading near the ends of discharge. Accordingly, the positive active material of the present invention has a significant cost merit over the popular $LiCoO_2$ for a rechargeable lithium battery without sacrificing the high capacity of $LiCoO_2$.

The following examples further illustrate the present invention.

EXAMPLE 1

Nickel hydroxide and manganese hydroxide were co-precipitated in a 9:1 mole ratio to prepare a nickel-manganese oxyhydroxide. LiOH was mixed with the nickel-manganese oxyhydroxide and they were mixed in a mortar.

The mixture was heat-treated (first heat-treatment) at 700° C. for 20 hours while dry air was blowing on it to prepare $LiNi_{0.9}Mn_{0.1}O_2$ powder. The size and shape of particles of $LiNi_{0.9}Mn_{0.1}O_2$ were confirmed by SEM and the structure thereof was confirmed by XRD.

The $LiNi_{0.9}Mn_{0.1}O_2$ powder was dipped into a 5% Al-isopropoxide solution and shaken for about 10 minutes to coat uniformly on the $LiNi_{0.9}Mn_{0.1}O_2$ powder with the Al-isopropoxide solution. The coated powder was dried for about 2 hours under ambient atmosphere.

The dried $LiNi_{0.9}Mn_{0.1}O_2$ powder was heat-treated (second heat-treatment) at 300° C. for 10 hours while dry air was blown on it. The resultant positive active material was $Al_2O_3$-coated $LiNi_{0.9}Mn_{0.1}O_2$.

EXAMPLE 2

A positive active material was prepared by the same procedure as in Example 1 except that nickel hydroxide was mixed with manganese hydroxide in a mole ratio of 7:3, a 10% Al-isopropoxide solution was used, the first heat-treating step was performed at 750° C. for 12 hours and the second heat-treating step was performed at 500° C. for 10 hours.

EXAMPLE 3

A positive active material was prepared by the same procedure as in Example 1 except that nickel hydroxide was mixed with manganese hydroxide in the mole ratio of 7:3, a 10% Al-isopropoxide solution was used, the first heat-treating step was performed at 700° C. for 12 hours and the second heat-treating step was performed at 500° C. for 10 hours.

EXAMPLE 4

A positive active material was prepared by the same procedure as in Example 1 except that nickel hydroxide was mixed with manganese hydroxide in the mole ratio of 5:5, a 1.0% Al-isopropoxide solution was used, the first heat-treating step was performed at 650° C. for 12 hours and the second heat-treating step was performed at 700° C. for 10 hours.

EXAMPLE 5

A positive active material was prepared by the same procedure as in Example 1 except that nickel hydroxide was mixed with manganese hydroxide in the mole ratio of 1:9, a 1.0% Al-isopropoxide solution was used, and the first heat-treating step was performed at 750° C. for 20 hours.

EXAMPLE 6

A positive active material was prepared by the same procedure as in Example 1 except that nickel hydroxide was mixed with manganese hydroxide in the mole ratio of 5:5, a 5.0% Al-isopropoxide solution was used, the first heat-treating step was performed at 650° C. for 12 hours, and the second heat-treating step was performed at 700° C. for 10 hours.

EXAMPLE 7

A positive active material was prepared by the same procedure as in Example 1 except that nickel hydroxide was mixed with manganese hydroxide in the mole ratio of 7:3, a 5.0% Mg-methoxide solution was used, the first heat-treating step was performed at 750° C. for 12 hours, and the second heat-treating step was performed at 750° C. for 10 hours.

COMPARATIVE EXAMPLE 1

A positive active material was prepared by the same procedure as in Example 2 except that the coating with the Al-isopropoxide solution was not carried out.

Each of the positive active materials according to Examples 1 to 7 and Comparative Example 1 were individually mixed with a Super P conductive carbon powder, and a polyvinylidene fluoride binder (94/3/3 weight ratio) in N-methyl pyrrolidone to prepare a slurry. The slurry was coated on an Al-foil current collector to produce a positive electrode. Using the positive electrode and a lithium metal reference/counter electrode, a 2016-type coin cell was fabricated. A 1M $LiPF_6$ solution of ethylene carbonate and dimethyl carbonate (1/1 volume ratio) was used for an electrolyte. A microporous polyethylene film was used for a separator.

Figure 1B:
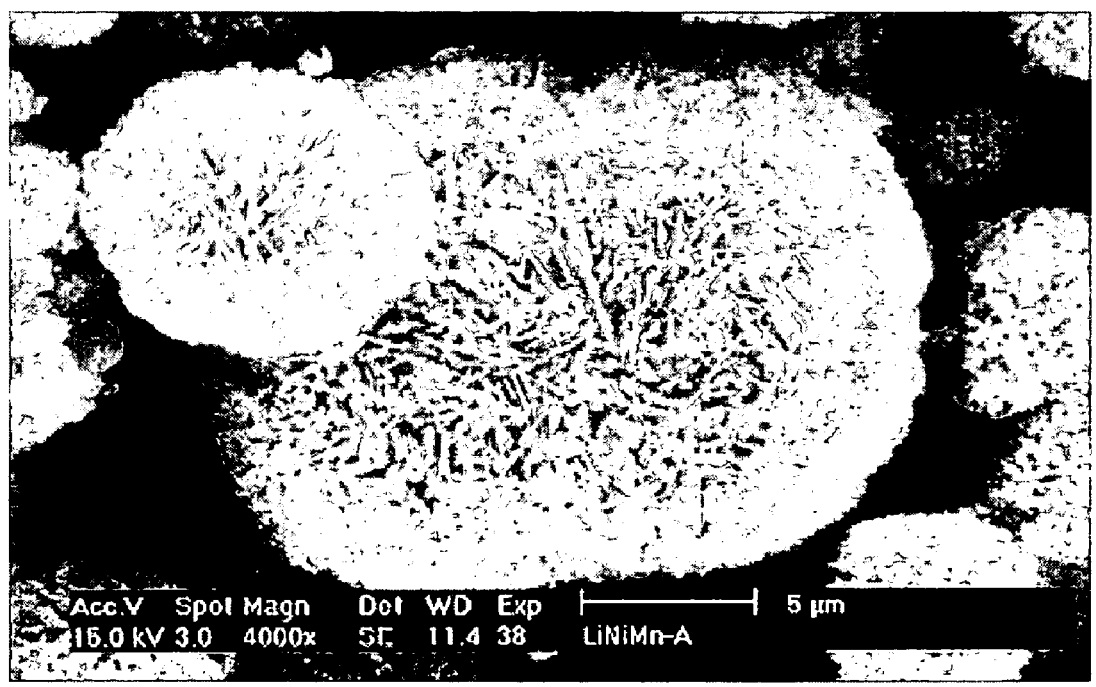
FIG. 1b is the SEM photograph of FIG. 1a enlarged by 10 times.

The SEM photograph of the positive active material according to Example 2 is shown in FIG. 1a. FIG. 1b is a view of FIG. 1a expanded 10 times. As shown in FIGS. 1a and 1b, the positive active material according to Example 2 has a substantially spherical form and uniform shape with various particle sizes giving an increased packing density of the positive active material in the positive electrode, thereby giving improved capacity.

Figure 2:
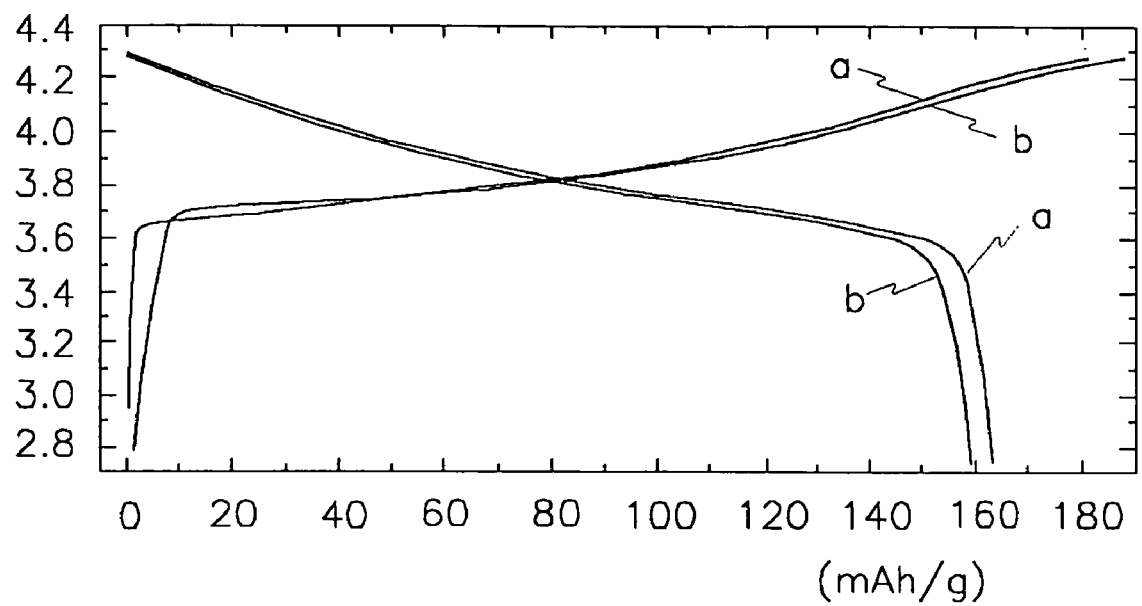
FIG. 2 is a graph illustrating the low-rate charge and discharge characteristics at the first cycle of positive active materials according to an Example and Comparative Example of the present invention.

To evaluate the effects of the metal oxide layer on the charge and discharge characteristics, initial charge characteristics of the cells according to Example 2 and Comparative Example 1 were evaluated. The initial charge and discharge characteristics were measured at a 0.1C rate between 4.3V and 2.75V. The results are presented in FIG. 2. As shown in FIG. 2, the discharge potential and discharge capacity of the cell of Example 2 (a) are higher than those of Comparative Example 1 (b). These improvements are deemed to be owing to the modification of the surface structure, i.e., the metal oxide layer on the surface of the positive active material. In addition, the total area under the voltage curve for the discharge (total usable energy) of the cell of Example 1 in FIG. 2 is larger than that of Comparative Example 1, showing higher available energy for the cell of Example 1 than that of Comparative Example 1.

Figure 3:
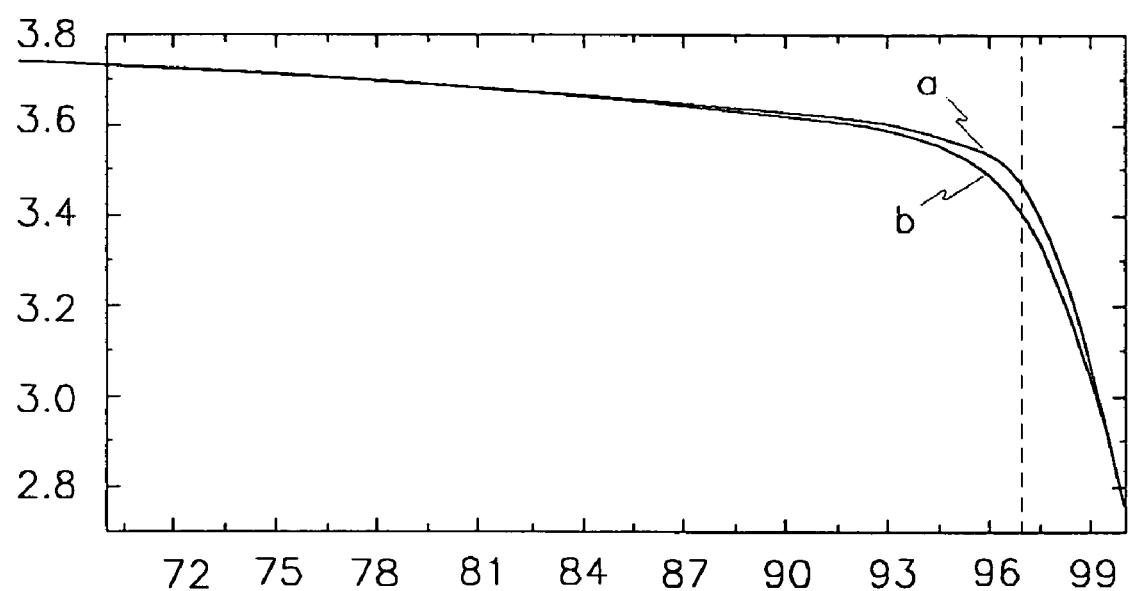
FIG. 3 is a graph illustrating the discharge potential at the first cycle of positive materials according to an Example and Comparative Example of the present invention.

In order to show the advantageous effect of the metal oxide layer on the first discharge potential clearly, the discharge potentials shown in FIG. 2 are re-plotted against relative (percentage) specific discharge capacity in FIG. 3. It is evident from FIG. 3 that the discharge potentials at approximately 93 to 98% specific discharge capacity of Example 2 (a) is significantly higher than those of Comparative Example 1 (b), and as large as about 0.1V (about 3%) at a certain point.

Figure 4:
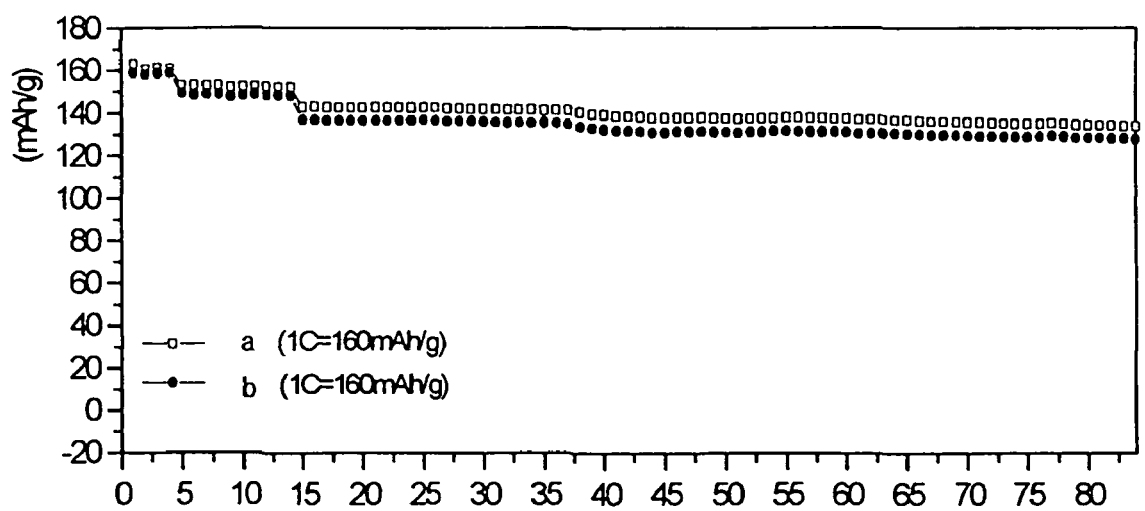
FIG. 4 is a graph illustrating cycle life characteristics of positive active materials according to an Example and Comparative Example of the present invention.

The cycle life characteristics of the cells according to Example 2 and Comparative Example 1 are presented in FIG. 4. As shown in FIG. 4, the cycle life characteristics of the cell according to Example 2 (a) is slightly better than that of Comparative Example 1 (b).

Figure 5:
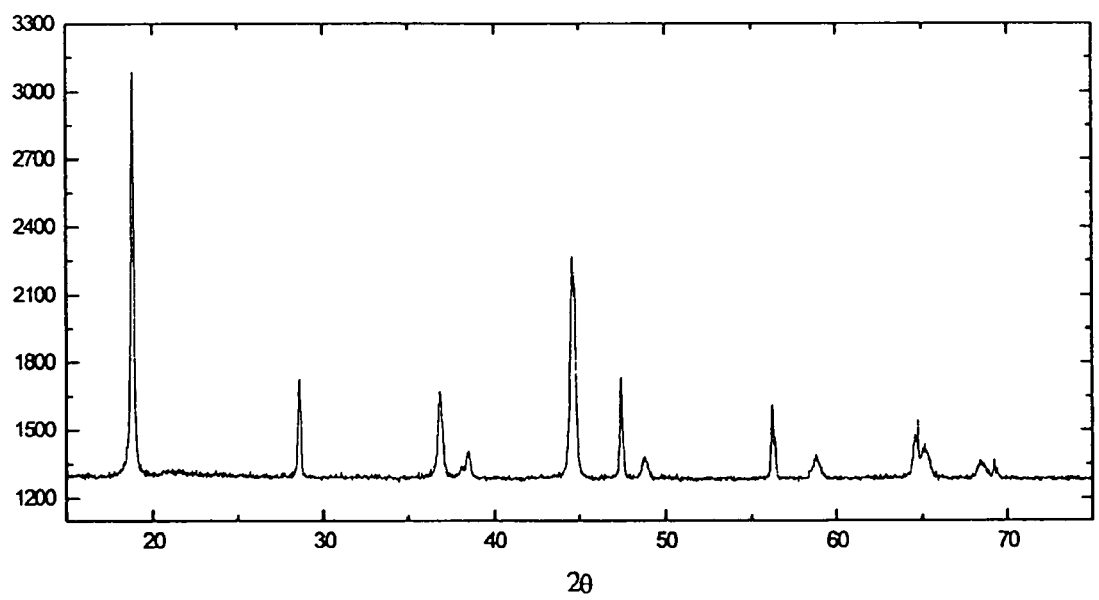
FIG. 5 is a graph showing an XRD (X-ray diffraction) result of positive active materials according to an Example and Comparative Example of the present invention.

The structural characteristic of the positive active material according to Example 3 was confirmed by XRD and the result is shown in FIG. 5.

Figure 6:
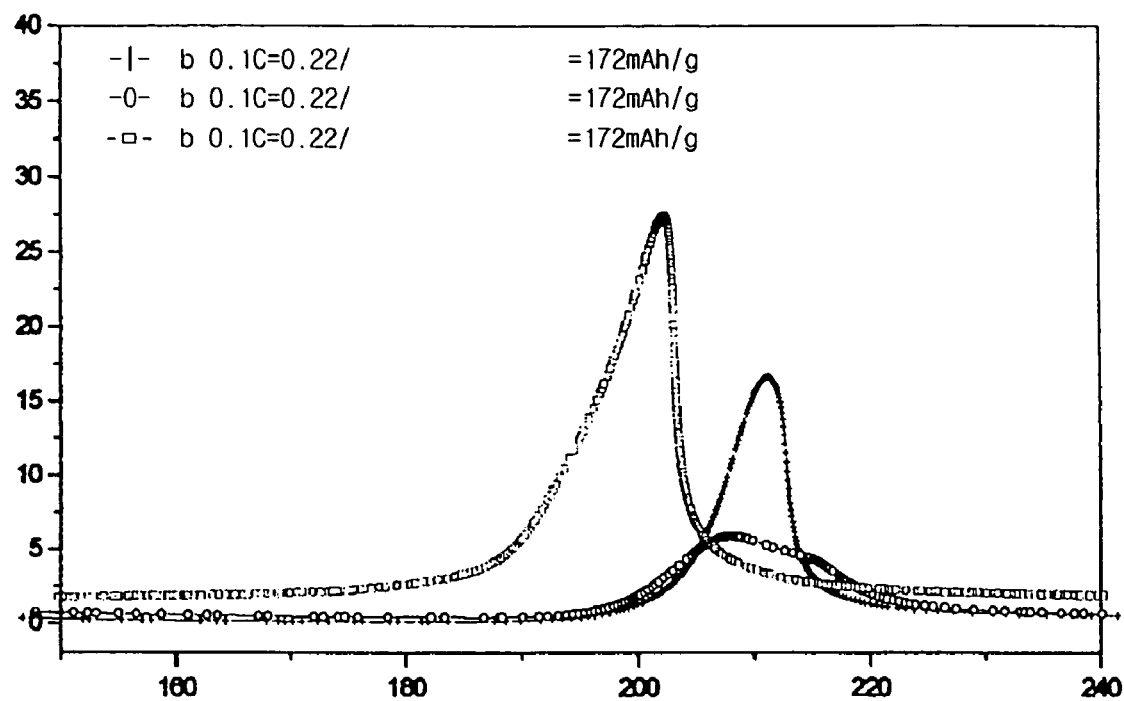
FIG. 6 is a graph illustrating a DSC (differential scanning calorimetry) result of a positive active material according to an Example and Comparative Example of the present invention.

The effect of the metal oxide layer on the thermal stability was confirmed by DSC (differential scanning calorimetry). After cells according to Example 2, Comparative Example 1 and $LiNi_{0.9}Co_{0.1}Sr_{0.002}O_2$ (Honjo, Co.) were charged to 4.3V, DSC measurements were carried out and the results are presented in FIG. 6 (Example 2: a; Comparative Example 1: b; $LiNi_{0.9}Co_{0.1}Sr_{0.002}O_2$: c). FIG. 6 demonstrates that the cell of Example 2 (a) showed smallest exothermic peak, whereas those of Comparative Example 1 (b) and $LiNi_{0.9}Co_{0.1}Sr_{0.002}O_2$ (c) each showed a larger exothermic peak than that of Example 2. When the cell is charged, the manganese active material is converted into unstable $Li_{1-x}NiMn_2O_4$. The bond between metal and oxygen (Mn—O) of this compound is easily broken releasing oxygen. The released oxygen reacts with other cell components such as the electrolyte at elevated temperature producing heat, and the produced heat causes the exothermic DSC peak. A smaller exothermic peak area means that the reactivity of the positive active material with the electrolyte is smaller. The observation that the active material according to Example 2 shows a small exothermic peak means that it has an excellent stability.

Figure 7:
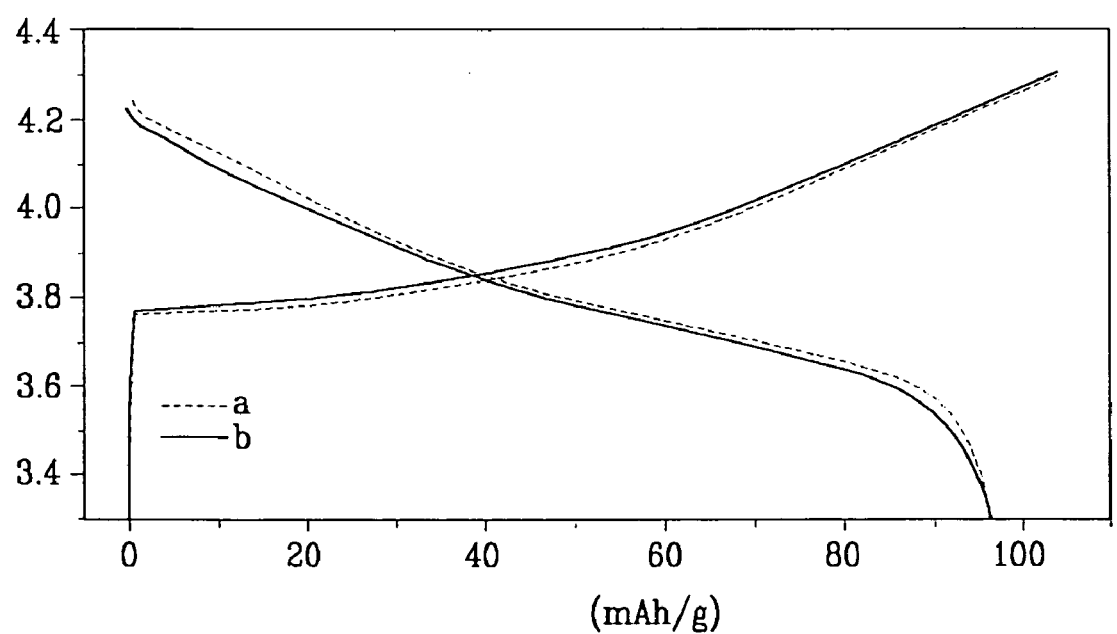
FIG. 7 is a graph illustrating the high-rate charge and discharge cycle characteristics at the first cycle of positive active materials according to an Example and Comparative Example of the present invention.
Figure 8:
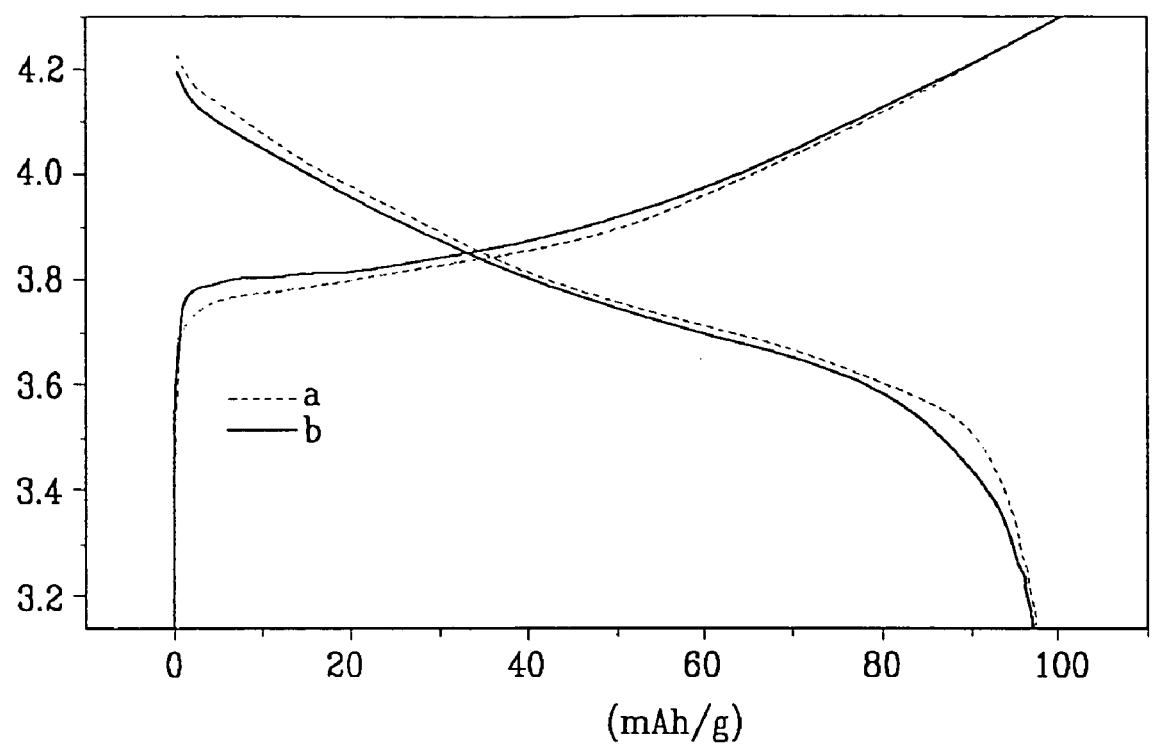
FIG. 8 is a graph illustrating the charge and discharge characteristics after 50 cycles of positive active materials according to an Example and Comparative Example of the present invention.

Finally, the effect of the metal oxide layer on the high rate (1C) charge and discharge characteristics were evaluated by measuring the charge and discharge voltage curves at the first cycle and the fiftieth cycles of the cells according to Example 2 and Comparative Example 1, respectively. The results are presented in FIGS. 7 and 8. In FIGS. 7 and 8, "a" denotes Example 2 and "b" denotes Comparative example 1. It is evident from FIGS. 7 and 8 that the charge and discharge potentials at the first as well as fiftieth cycles of the cell of Example 1 are higher than those of Comparative Example 1.

The positive active material of the present invention have much reduced raw material cost and therefore can be produced at a reduced cost in comparison with popular $LiCoO_2$ while it exhibits good electrochemical properties. Therefore, a high cost $LiCoO_2$ may be replace by the positive active materials of the present invention. It is also expected that a battery using the positive active material of the present invention will exhibit improved energy (Wh), cycle life, and thermal stability which is closely related to the battery safety.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a positive active material for a rechargeable lithium battery, the positive active material including at least one selected from the group consisting of formulas 1 to 4 and being coated with metal oxide or composite metal oxide, comprising the steps of:

preparing at least one compound selected from the group consisting of formulas 1 to 4;

$$Li_xNi_{1-y}Mn_yF_2 \quad (1)$$

$$Li_xNi_{1-y}Mn_yS_2 \quad (2)$$

$$Li_xNi_{1-y-z}Mn_yM_zO_{2-a}F_a \quad (3)$$

$$Li_xNi_{1-y-z}Mn_yM_zO_{2-a}S_a \quad (4)$$

where M is selected from the group consisting of Co, Mg, Fe, Sr, Ti, B, Si, Ga, Al, Sc, Y, La, Ce, Pr, Nd, Pm, Sm, Eu, Gd, Tb, Ho, Er, Tm, Yb, Lu, Ac, Th, Pa, U, Np, Pu, Am, Cm, Bk, Cf, Es, Fm, Md, No and Lr, and $0.95 \leq x \leq 1.1$, $0 < y \leq 0.99$, $0 \leq z \leq 0.5$, and $0 < a \leq 0.5$;

coating the compound with a metal alkoxide solution, an organic solution of metal salt or an aqueous solution of metal salt; and heat-treating the coated compound.

2. The method of claim 1 wherein the compound selected from the group consisting of formulas 1 to 4 is prepared by co-precipitating nickel salt and manganese salt to prepare a nickel manganese salt;

mixing the resultant nickel manganese salt with a lithium salt; and heat-treating the mixture.

3. The method of claim 2 wherein a fluorine or sulfur salt is further used in the co-precipitating step.

4. The method of claim 2 wherein a metal salt is further used in the mixing step.

5. The method of claim 2 wherein the heating step is performed at 200 to 900° C. for 1 to 20 hours.

6. The method of claim 2 wherein the heating step is performed under an oxidation atmosphere.

* * * * *